UNITED STATES PATENT OFFICE.

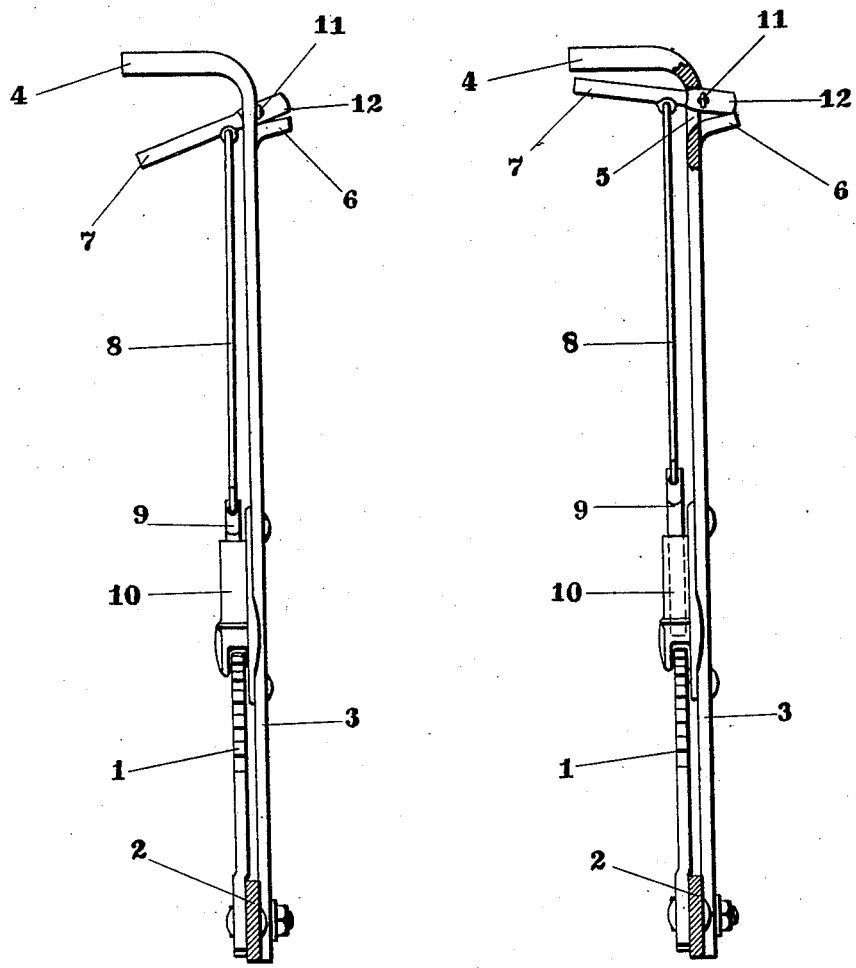

THEOPHILUS BROWN AND CARL G. STRANDLUND, OF MOLINE, ILLINOIS, ASSIGNORS TO DEERE & COMPANY, OF MOLINE, ILLINOIS, A CORPORATION OF ILLINOIS.

LEVER.

1,313,253.  Specification of Letters Patent.  Patented Aug. 19, 1919.

Application filed March 9, 1918, Serial No. 221,448. Renewed November 7, 1918. Serial No. 261,550.

*To all whom it may concern:*

Be it known that we, THEOPHILUS BROWN and CARL G. STRANDLUND, citizens of the United States, residing at Moline, in the county of Rock Island and State of Illinois, have invented certain new and useful Improvements in Levers, of which the following is a specification, reference being had therein to the accompanying drawing.

This invention relates to levers combined with a bolt and ratch and commonly employed, for various purposes, on different mechanisms but more particularly with agricultural machinery. The object of the invention is the production of such a device that will be effective in operation, economical in construction and easily assembled.

Referring to the drawings in which similar numerals indicate identical parts—

Figure 1 is a side elevation of the lever and connected parts with the bolt in engagement with the ratch, and, Fig. 2 is a similar view with the parts in the position they occupy when the bolt is raised.

A segmental ratch 1 is mounted on a support 2 on which is also pivoted a lever 3. The free end of the lever is bent to form a grip 4. Below the grip 4, by operation of a punch, we force out sufficient of the lever material to form a slot 5, the material so punched out being bent over in the operation to substantially a right angle to the lever creating a support 6 for an end portion of a movable grip 7 which is extended through the slot 5, the support 6 however, may be a separate piece secured on the lever 3 below the slot 5 in any desired manner. A rod 8 is connected, at its upper end to an eye in the grip 7, and its lower end is connected to a bolt 9 housed in a casing 10 and adapted to engage with any one of the notches in the ratch 1. The grip 7 is retained in place through the slot 5, by a pin or cotter 11 extending through a perforation in the grip 7 between the free end thereof and the lever 3.

It will be seen by the construction just described that the grip 7 operates as a lever having its fulcrum on the support 6 and free to rock and move thereon when it is actuated to raise and lower the bolt 9. As shown in Fig. 1 where the bolt 9 is in a notch of the ratch 1, the grip 7 has its fulcrum on the support 6 adjacent the end of the latter, and its end 12 is out of contact with the support 6. As the grip 7 is raised the fulcrum shifts toward the end 12 until the termination of the latter is in contact with the support 6, consequently as the grip 7 is operated to raise the bolt its leverage decreases until the end 12 is in full contact with the support 6.

The economical construction is noticeable as contrasted with other devices of the kind, the end 12 of the grip 7 having no fixed connection with the support 6 and free to rock thereon when the grip 7 is actuated.

What we claim is—

1. The combination of a pivotally supported lever, a ratch, a dog on the lever to engage with said ratch, a support on the lever projecting from one side thereof, and a rocking grip connected with said dog and extending on opposite sides of said lever and operable to raise the dog, said grip being fulcrumed on said support adjacent the lever when the dog is down and shifting its fulcrum as the dog is raised.

2. The combination of a pivotally supported lever, a ratch, a dog on the lever to engage with said ratch, a support on the lever projecting from one side thereof, and a rocking grip connected with said dog and extending on opposite sides of said lever and operable to raise the dog, said grip being fulcrumed intermediate its ends on said support adjacent the lever when the dog is down, the fulcrum moving toward the end of the support as the grip is rocked to raise the dog.

3. The combination of a pivotally supported lever, a ratch, a dog on the lever to engage with said ratch, a slot in the lever adjacent the upper end thereof, a support on the lever extending outwardly from the base of the slot, a rocking grip connected with said dog and projected through the slot and operable to raise the dog and having its fulcrum on said support adjacent the lever when the dog is down, the fulcrum moving toward the end of the support and away from the lever as the grip is rocked to raise the dog.

4. The combination of a pivotally supported lever, a ratch, a dog on the lever to engage with said ratch, a slot in the lever adjacent the upper end thereof, a support on the lever extending outwardly from the base of the slot, and a rocking grip connected with said dog on the opposite side of the lever from the support thereon and actuable to raise the dog, said grip being fulcrumed intermediate its ends on the support adjacent the lever when the dog is down, said fulcrum shifting toward the end of the support as the grip is rocked to raise the dog.

5. The combination of a pivotally supported lever, a ratch, a dog on the lever to engage with said ratch, a slot in the lever, a support on the lever extending outwardly from the base of the slot, and a rocking grip extending through said slot and in contact with said support, and a connection between said dog and grip whereby the dog is raised as the grip is rocked.

THEOPHILUS BROWN.
CARL G. STRANDLUND.

Copies of this patent may be obtained for five cents each, by addressing the "Commissioner of Patents, Washington, D. C."